United States Patent [19]

Nienhuis

[11] Patent Number: 4,976,060
[45] Date of Patent: Dec. 11, 1990

[54] WEEDLESS FISH LURE

[76] Inventor: James I. Nienhuis, 701 Bering Dr. #1006, Houston, Tex. 77057

[21] Appl. No.: 369,025

[22] Filed: Jun. 20, 1989

[51] Int. Cl.⁵ ............................................. A01K 85/00
[52] U.S. Cl. ................................................... 43/42.41
[58] Field of Search ............................. 43/42.1, 42.41

[56] References Cited

U.S. PATENT DOCUMENTS

| | | | |
|---|---|---|---|
| 1,846,538 | 2/1932 | Albers et al. | 43/42.1 |
| 2,306,181 | 12/1942 | Neumann | 43/42.1 |
| 2,450,988 | 10/1948 | Putman et al. | 43/42 |
| 2,572,608 | 10/1951 | Gabor | 43/42.1 |
| 2,690,026 | 9/1954 | King | 43/42.02 |
| 3,060,620 | 10/1962 | Binkowski | 43/42.24 |
| 3,230,656 | 1/1966 | Kozjak | 43/42.1 |
| 4,138,792 | 2/1979 | Hill | 43/42.42 |
| 4,143,478 | 3/1979 | Nickolas et al. | 43/42.1 |
| 4,196,884 | 4/1980 | Zeman | 43/42.1 |
| 4,316,343 | 2/1982 | Creme | 43/42.42 |
| 4,367,607 | 1/1983 | Hedman | 43/42.1 |
| 4,592,161 | 6/1986 | Smith et al. | 43/42.42 |
| 4,782,618 | 11/1988 | Rainey | 43/35 |

Primary Examiner—Richard K. Seidel
Assistant Examiner—James Miner
Attorney, Agent, or Firm—Marsteller & Associates

[57] ABSTRACT

This invention teaches an artificial fish lure body (11) of pliable rubbery material having a first groove (18), a second groove (20), and a passageway (22) with an opening (24) at the frontal portion of the lure body (11) and another opening (26) at the frontal portion of the first groove (18). A fishing line (12) is threaded through the passageway (22) to reach the first groove (18) to receive hooks (14) which, upon proper attachment to the lure body (11) by vertical piercing through the lure body (11), are substantially concealed within the grooves (18), (20) and, as a result, are protected from entanglement with weeds and other debris in the fishing water. Weights (32) can be easily added to the lure body (11) via the hooks (14) if the angler so desires.

12 Claims, 1 Drawing Sheet

WEEDLESS FISH LURE

BACKGROUND OF THE INVENTION

1. Technical Field.

This invention relates generally to a fishing lure, and more particularly to an artificial plastic fishing lure having the appearance of a live bait wherein the hook means are substantially concealed within the plastic body portion of the lure as to prevent entanglement of the hook means in weeds, algae, or other matter found in water.

2. Background Art.

One problem an angler often encounters is the entanglement of his fishing hook in objects such as weeds or algae in the fishing water. Such entanglement not only greatly reduces the functions of the lure in attracting and hooking fish, it might also result in loss of the lure.

Several "weedless" fishing lures have been invented and patented. In U.S. Pat. No. 3,060,620, Binkowski discloses a skirt to be applied over the shank portion of a hook to shroud the barb point of the hook. Binkowski's patent is distinguishable over the present invention in its basic design, i.e. the hook is not enclosed in the plastic body of a lure in the form of a minnow, snake, frog, and the like for prevention from entanglement.

U.S. Pat. No. 3,230,656 granted to Kozjak and U.S. Pat. No. 4,782,618 granted to Rainey both teach weedless fishing lures with the hook concealed in the body of an artificial lure. However, the lure in Kozjak's patent is composed of three separate parts which have to be assembled together before use, while the lure disclosed in the present invention is an integral article. Rainey's invention, on the other hand, teaches a lure composed of two parts. Furthermore, it differs from the present invention in that it is much more complicated in design and contains cam means and spring means.

Other related art to the present invention is U.S. Pat. No. 4,367,607 granted to Hedman. Hedman's patent and the present invention both teach a plastic lure with top and bottom grooves on the body of the lure. However, only one hook can be applied to the one lure in Hedman's patent, while a plurality of hooks can be mounted onto the one lure in the present invention.

Also, the lure is detachably secured to other parts of the fishing device through a retainer means in Hedman's patent. In contrast, no retainer means is used in the present invention. Rather, a passageway is present in the lure of this invention. This passageway, with one opening located at the exterior wall of the lure and another opening located within the bottom groove of the lure, can accommodate a fishing line to connect the lure with other parts of the fishing device.

Furthermore, both grooves on the lure of the present invention function to substantially conceal the hooks. As a result, entanglement of the hooks in weeds or similar matter is unlikely. In Hedman's patent, only the top groove functions to enclose the hook and part of the arcuate portion and the shank portion of the hook remain exposed. Thus, the hook is still vulnerable to entanglement in undesirable objects in the fishing water.

Other patents relating generally to the present invention include U.S. Pat. No. 2,450.988 - Putnam et al., U.S. Pat. No. 2,572,608 - Gabor, U.S. Pat. No. 2,690,026 - King, U.S. Pat. No. 3,060,620 - Binkowski, U.S. Pat. No. 4,138,792 - Hill, U.S. Pat. No. 4,316,343 - Creme, and U.S. Pat. No. 4,592,161 - Smith et al. All these patents disclose an artificial plastic fish bait which simulates a worm, a snake, or a frog and onto which a hook or a plurality of hooks can be mounted. Unlike the present invention, the "weedless" feature is lacking in all of these cited patents.

DISCLOSURE OF INVENTION

It is an object of this invention to provide a plastic artificial fishing lure which can be used repeatedly.

It is another object of this invention to provide a plastic artificial fishing lure which has the appearance of a worm, a minnow, a frog, a snake, and the like as to attract the fish.

Still another object of this invention is to provide a plastic artificial fishing lure wherein the hook(s) is substantially concealed within the lure as to prevent entanglement of the hook(s) in weeds, algae, and the like.

A further object of this invention is to provide a plastic artificial fishing lure which can be easily attached to and removed from the fishing device.

A further object of this invention is to provide a plastic artificial fishing lure onto which a desirable number of weights can be easily attached via the hook(s).

It is another object of this invention to provide a plastic artificial fishing lure which is easy to assemble and efficient in operation.

It is yet another object of this invention to provide a plastic artificial fishing lure which is easy to manufacture.

The present invention generally comprises a plastic artificial lure with top and bottom longitudinal alignment grooves wherein a hook properly mounted to the lure can be substantially concealed. The presence of such grooves also facilitates the mounting of a hook onto the lure as the hook only has to be pushed through a much narrowed portion of the lure body.

Furthermore, a passageway is formed through the lure body in the present invention. Both ends of the passageway terminate at the bottom groove and the frontal portion of the lure respectively. The passageway functions to accommodate a fishing line which is connected to the fishing pole at one end and to the hook at another, with the hook secured to the lure for use.

One or more than one weight can be attached to the lure via the hook(s) as the angler desires.

Further features and advantages of the present invention will become apparent from the following description taken in conjunction with the accompanying drawings and appended claims.

MODE(S) FOR CARRYING OUT THE INVENTION

So that the manner in which the above recited features, advantages and objects of the present invention are attained can be understood in detail, more particular description of the invention, briefly summarized above, may be had by reference to the embodiment thereof which is illustrated in the appended drawings. In all the drawings, identical numbers represent same elements.

Figure 1:
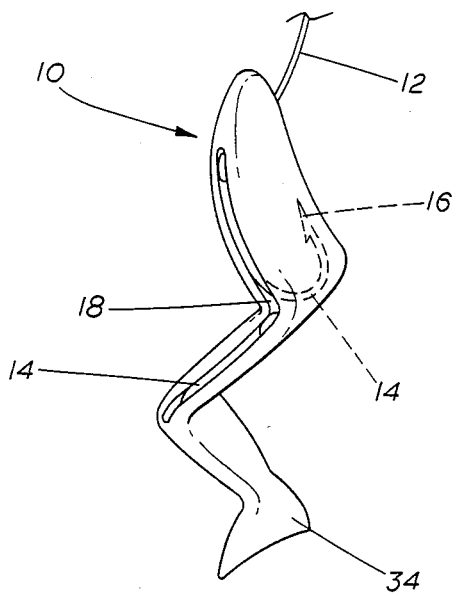
FIG. 1 provides a perspective view of the weedless artificial lure.
Figure 2:
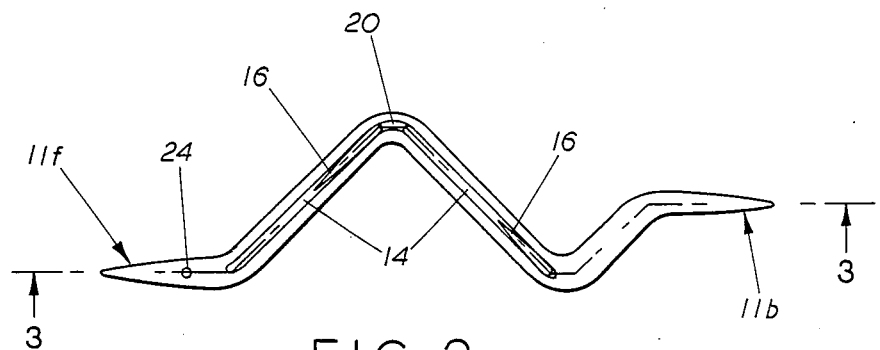
FIG. 2 provides a top view of the weedless artificial lure.

A preferred embodiment of the weedless plastic artificial lure in the form of a minnow is shown in FIG. 1 and is referred to generally by reference number 10. The artificial minnow is made of pliable plastic or other suitable material and is formed in Z-shape body member 11 as to simulate a minnow in swimming action.

The Z-shape of the lure 10 acts to promote the side-to-side displacement of the lure 10 as it is pulled through the water in which it is immersed. This "swimming" action is believed to improve the attractiveness and effectiveness of the lure as bait.

Also shown in FIG. 1 are a fishing line 12 and two hooks 14 which have been affixed to the lure 10. More specifically, the hooks 14 are first secured to a fishing line 12 and then, with the aid of the pointed portion 16, are pushed through the body of the lure 10. The assembly of the fishing line 12 and the hooks 14 to the lure 10, as well as their spatial relationship with other essential elements of the lure 10, will be described in more detail below.

The lure body 11 contains two longitudinal grooves essentially aligned one above the other, i.e. a first or bottom groove 18 and a second or top groove 20. Both grooves 18 and 20 function to receive at least one hook 14 and conceal the hook or hooks from being exposed to foreign debris in the fishing water, such as weeds and algae.

Figure 3:
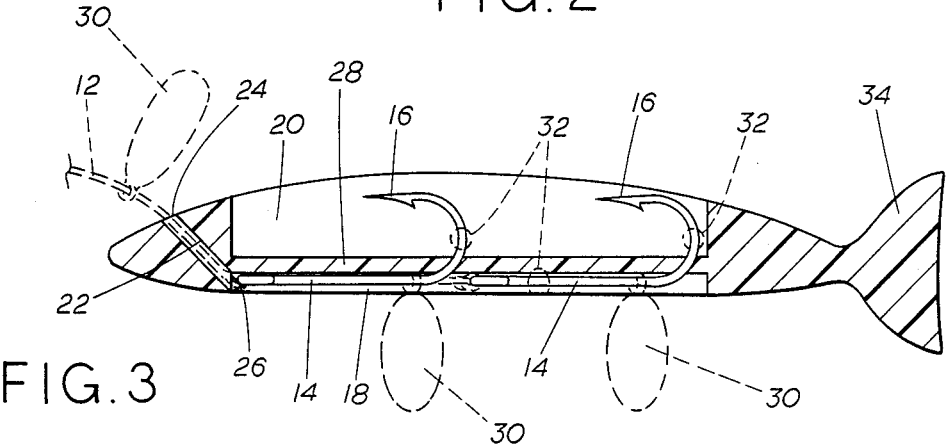
FIG. 3 provides a longitudinal cross sectional view taken along the line 3—3 as shown in FIG. 2.
Figure 4:
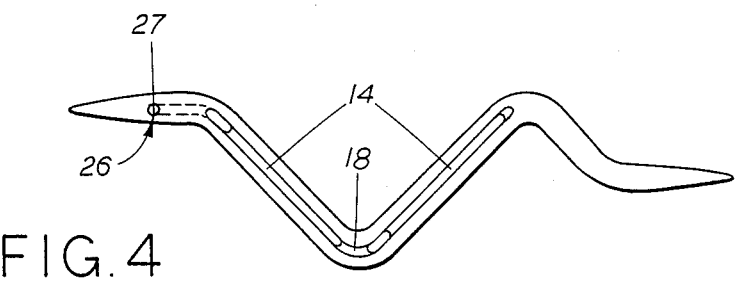
FIG. 4 provides a bottom view of the weedless artificial lure.

As shown in FIG. 3, the second groove 20 is preferably deeper than the first groove 18 so that it can entirely enclose the arcuate portion of the hook 14. The first groove 18, which is to conceal the shank portion of the hook 14, is shallower in depth.

Also shown in FIG. 3 is a passageway 22 through the head of lead portion of the lure body 11 with an opening 24 terminated at the frontal portion 11f of the lure body 11 and another opening 26 terminated at the frontal portion of the first groove 18. The back of the lure is represented as 11b. The passageway 22 has to be wide enough as to permit the threading of the fishing line 12 through the opening 24 to the first groove 18 where the hooks 14 are then attached to the fishing line 12 in a typical manner. If a plurality of hooks are used, then the fishing line 12 would be attached to each of the hooks in a known manner. Optionally, a separate "stringer" or length of wire 27 or the like can be formed in the front portion 11f or pass through the passageway 22. The line 12 can then be attached to the front end of the stringer 27 and the backward end would be attached to the hook 14.

The hooks 14 are removably secured to the lure body 11 by piercing through the lure body vertically. Due to the presence of the first and second grooves 18, 20, the lure body 11 has a rather thin central body or vane 28 through which the hooks 14 can be easily pushed. Optionally, holes can be formed in the central vane 28 through which the hooks can pass.

After the assembly of the fishing line 12 and the hooks 14 to the lure body 11, a spinner or blade 30 (shown in phantom) can then be optionally secured to the hook 14 as demonstrated in FIG. 3 or on line 12 near opening 24, if the angler so desires. Spinner 30 may also be selected as to disturb the path of the lure 10 as it is pulled through the water to produce a more erratic "swimming" motion. Similarly, spinners 30 may also generate noises or sounds through the water to attract the attention of the fish. Phantom circles 32 shown in FIG. 3 are places where additional weights or rings can be desirably attached to the hooks 14 as to add more weight to the lure 10 and to secure the hooks 14 within the second groove 20.

The lure body 11 is preferably made of pliable and rubbery material. It may also be formed in a manner having the physical features of a small bait, such as a minnow or worm. By way of example, FIG. 3 shows the lure 10 with a fins 34 simulating a minnow. As a result, a fish biting of the lure body 11 would cause the collapse of the enclosure walls of the second groove thereby exposing the pointed portion 16 of the hook 14 to catch the fish.

Although the invention has been described in its preferred form with a certain degree of particularity, it is understood that the present disclosure of the preferred form has been made only by way of example and that numerous changes in the details of size, shape and materials and the combination and arrangement of parts may be resorted to without departing from the spirit and the scope of the invention as hereinafter claimed.

I claim:

1. An artificial weedless fish lure of the type for use with fishing hooks comprising:
    a pliable body member having forward and rearward ends with a middle portion therebetween; and
    said body member including first and second longitudinal alignment grooves on the middle portion of said body member, and a connecting means for attaching a fishing line to a hook,
    said first groove desirably lies above a longitudinal axis in the pliable body member, and the second groove lies below the longitudinal axis and essentially aligned with the first groove,
    said first groove is formed for receiving and concealing a shank portion of a fishing hook, and the second groove is formed for concealing an arcuate portion of the fishing hook;
    whereby a fishing line can be attached to at least one hook, the hook, upon proper attachment to said body member by piercing a point portion of the hook vertically through the middle portion of the body member, is substantially concealed within the first and second grooves.

2. The invention of claim 1, wherein the connecting means includes a passageway having an opening at the forward end of said body member and another opening at the forward end of the first groove, whereby the fishing line can be threaded through the passageway to reach the first groove for attachment to at least one hook.

3. The invention in claim 1, wherein the body member has the appearance of a live bait.

4. The invention in claim 1, wherein the body member is made o plastic.

5. The invention in claim 1, wherein at least one weight is attached to the hook.

6. The invention in claim 1, wherein the body member is formed in a Z-shape.

7. An artificial weedless fish lure comprising:
    a pliable body member having forward and rearward ends with a middle portion therebetween;
    at least one fishing hook; and
    said body member including first and second longitudinal alignment grooves on the middle portion of said body member, and a connecting means for attaching a fishing line to the hook, said first groove desirably lies above a longitudinal axis in the pliable body member, and the second groove lies below the longitudinal axis and essentially aligned with the first groove, said first groove is formed for receiving and concealing a shank portion of the fishing hook, and the second groove is formed for concealing an arcuate portion of the fishing hook;

whereby a fishing line can be attached to at least one hook, the hook, upon proper attachment to said body member by piercing a point portion of the hook vertically through the middle portion of the body member, is substantially concealed within the first and second grooves.

8. The invention of claim 7, wherein the connecting means includes a passageway having an opening at the forward end of said body member and another opening at the forward end of the first groove, whereby the fishing line can be threaded through the passageway to reach the first groove for attachment to at least one hook.

9. The invention in claim 7, wherein the body member has the appearance of a live bait.

10. The invention in claim 7, wherein the body member is made of plastic.

11. The invention in claim 7, wherein at least one weight is attached to the hook.

12. The invention in claim 7, wherein the body member is formed in a Z-shape.

* * * * *